2,939,817

METHOD OF TREATING DISEASES ASSOCIATED WITH PLASMIN ACTIVITY

Fujio Nagasawa, Eiichi Takagi, and Mikio Yokoi, Tokyo, Masatsune Sato, Mitsuo Mangyo, and Isao Ensaka, Kanagawa-ken, and Shosuke Okamoto and Yasuzo Tsukada, Tokyo, Japan, assignors to Mitsubishi Kasei Kogyo Kabushiki Kaisha, Tokyo, Japan No Drawing. Filed Nov. 9, 1953, Ser. No. 391,136

12 Claims. (Cl. 167—65)

This invention relates to compositions useful as drugs for inhibiting pathological proteolytic enzymes in vivo, having an excellent therapeutic effect and almost no toxicity. More particularly, this invention relates to such compositions in which the active ingredient is ε-amino-η-caproic acid or a molecular compound thereof with calcium halide, such as calcium bromide and calcium chloride.

It is known that proteolytic enzymes (proteases) are found in cells and blood. Physiologically, such enzymes have been considered to be related with the protein metabolism of cells. Various studies have been made as to whether or not proteolytic enzymes in vivo are identical with digestive enzymes such as trypsin, pepsin and cathepsin (Nolf, P., Arch. internat. de physiol. 3, 1, 1905; Jobling, J. W., Peterson, W. and Eggstein, A. A., J. Exp. Med. 23, 401, 1915) and recently a specific kind of proteolytic enzyme was found in the human blood and was named "plasmin" or "fibrinolysin" (MacFarlane, R. G., and Pilling, J., Lancet 2, 562, 1946).

The inventors of the present invention have made various investigation as to the function of plasmin on the living organism, and have found out many grounds for believing that plasmin in cells and blood is activated in the case of a series of allergic diseases, such as inflammation, surgical shock, and also of physical and mental fatigue, that the decomposition of protein in vivo is caused by the above anomolous activity of the said enzyme, and that the products formed by the said decomposition give various troubles to the living organism. The above assertion was confirmed by the fact that the activation of plasmin was rapidly observed experimentally by the antigen-antibody reaction, which is the cause of allergy, (Ungar, G., and Mist, S. H., J. Exp. Med. 90, 39, 1949) and also by the fact that the toxic substance formed by the action of plasmin to the protein isolated from the living organism has the same features as those of histamine, acetylcholine and chemical substances causing inflammation, all of which have been considered as playing a leading part in allergy. (Rocha E. Silva, M., Arch. f. Exp. Path. and Pharm. 194, 335, 1940; Beraldo, W. T., Am. J. Physiol. 163, 283, 1950; Duthie, E. S., and Chain, G. Brit. J. Exp. Path. 20, 417, 1939). An important suggestion was made on proteolytic enzyme, from the viewpoint of pathological physiology, by the fact that the course of inflammation was made to progress favorably in an experimental inflammation (peritonitis) when trypsin was given repeatedly in advance to increase the antiproteolytic power in vivo. (Kay, J. H., and Lockwood, J. S., Surg. 21, 155, 1947).

It has hitherto been known that certain proteins such as soyabean-protein have a preventive effect on plasmin. And, these substances are all high molecular compounds and water-insoluble. Therefore, such substances cannot be injected in vivo, and are not practicable because of their toxicity. It is also known that albumin fraction in vivo has inhibitory power to plasmin (MacFarlane, R. G., and Biggs, R., Blood 3, 1167, 1948) and the said albumin fraction was used by Smith et al. clinically for a case of pregnancy toxicosis. (Smith, O. W., and Smith, G. V., Proc. Soc. Exper. Biol. and Med., 62, 277, 1946; Smith, O. W., and Smith, G. V., Science, 102, 253, 1945). A mass production of such substance, however, is difficult, and it is not suited for pharmaceutical purposes.

The inventors, therefore, made studies on the antiplasmin substances, which inhibit the activity of plasmin in vivo, thereby preventing certain troubles in the living organism. As the result of the isolation of plasmin from the living organism and of the systematic studies made in vitro with the chemical substances having inhibitory power to plasmin, the inventors have found out one group of such substances from among three hundred different kinds of synthetic substances. Such chemical substances inhibit plasmin at their low concentration of about $0.2 \times 10^{-5}$ mol, and are satisfactory from the viewpoint of non-toxicity and of pharmaceutical technics.

One object of the present invention is to provide compositions useful as drugs for inhibiting plasmin in vivo, having an excellent therapeutic effect and almost no toxicity, more especially, such compositions in which the active ingredient is ε-amino-η-caproic acid or molecular compounds thereof with calcium halide, such as calcium bromide and calcium chloride.

According to the present invention, the active ingredient may be admixed with a carrier which may be either a sterile parenteral liquid or a solid material. The compositions may take the form of tablets, powders, capsules or other dosage forms which are particularly useful for oral ingestion. Liquid diluents are employed in sterile condition for parenteral use, that is, by injection. Such a medium may be a sterile solvent such as water. The compositions may take the form of active material, namely, active ingredient thereof, admixed with solid diluents and/or tableting adjuvants such as cornstarch, lactose, talc, stearic acid, magnesium stearate, gums, or the like. Any of the tableting materials used in pharmaceutical practice may be employed where there is no incompatibility with the said active ingredient. The material may be tableted with or without adjuvants. Alternatively the active ingredient with its adjuvant material may be placed in the usual capsule or resorbable material such as the usual gelatin capsule and administered in that form. In yet another embodiment, the composition may be put up into powder packets. Or the composition may be prepared in the form of suspension in a material in which the active ingredient is not soluble. Or the active ingredient may be employed as ointment by admixing the same with any ointment used in pharmaceutical practice, for example, oil-in-water type or water-in-oil type cream.

The present invention embraces the use of active ingredients in various forms, e.g., as ε-amino-η-caproic acid or in the form of molecular compounds thereof with calcium halide of which calcium bromide and calcium chloride are illustrative. The term "$\epsilon_1$," as used herein, will mean ε-amino-η-caproic acid, and the term "$\epsilon_2$" will mean molecular compounds of ε-amino-η-caproic acid with calcium halide. $\epsilon_1$ is mainly used as injection, ointment and capsule, while $\epsilon_2$ is mainly used as injection, powder, tablet and capsule. As the molecular compound of ε-amino-η-caproic acid with calcium chloride is not hygroscopic, it is particularly suited for use as powder and tablet. On the other hand, an excellent result can be obtained from $\epsilon_2$ which at the same time has pharmacological effects inherent to calcium halide.

$\epsilon_1$, namely, ε-amino-η-caproic acid can be prepared advantageously by the processes described in the Japanese Patent No. 215,679 and in the Japanese Patent 215,676. According to the processes of the former application, ε-caprolactam is heated and hydrolyzed with oxide or hydroxide of alkaline earth metal under normal or increased pressure so that ε-amino-η-caproic acid is produced, carbon dioxide gas is introduced into the solution obtained so that alkaline earth metal carbonate difficultly soluble in water is produced, or ortho-phosphoric acid, sulfuric acid or oxalic acid is added into the said solution so that salt of the respective alkaline earth metal difficultly soluble in water is produced, and after the solution is filtered, ε-amino-η-caproic acid free from inpurity is produced from the filtrate. $\epsilon_1$ thus produced has a high purity suitable as medicine in vivo as well as in vitro. According to the processes of the latter application, ε-amino-η-caproic acid, one of ω-amino acid, is produced from the derivatives, such as ester, nitrile, amide etc., of ε-amino-η-caproic acid, except ε-caprolactam, and, just as in the case of the former application, $\epsilon_1$ thus produced has a high purity suitable as medicine in vivo as well as in vitro.

On the other hand, $\epsilon_2$, namely, molecular compounds of ε-amino-η-caproic acid with calcium halide are novel compounds which can not be found in the literature, and such compounds are produced by the processes described in the Japanese Patent No. 212,426. The processes comprise producing molecular compounds of ω-amino acid with halides of alkaline earth metal by reacting ω-amino acid with calcium halide. Namely, according to the above processes, $\epsilon_2$, molecular compounds of ε-amino-η-caproic acid, which is one of ω-amino acid, with calcium halide can be produced. The above processes embrace also the steps of hydrolyzing derivatives of ε-amino-η-caproic acid such as lactam, ester, nitrile, amide etc. thereof with calcium oxide or hydroxide, and then adding hydrogen halogenic acid, or the steps of hydrolyzing the said derivatives with hydrogen halogenic acid and then adding thereto calcium oxide, hydroxide or carbonate. $\epsilon_2$, the mol ratio of which is 4:1, and are represented by the following formula:

$$4NH_2(CH_2)_5COOH \cdot CaX_2$$

in which X represents halogen.

Among the compounds belonging to $\epsilon_2$, molecular compound of ε-amino-η-caproic acid with calcium chloride is of colorless tabular- or rod-shaped crystal, with the melting point of 206–208° C. The result of elementary analysis is shown in the following table, from which it is clear that the mol ratio of ε-amino-η-caproic acid to calcium chloride in the said molecular compound is 4:1:

| $4NH_2(CH_2)_5COOH \cdot CaCl_2$ | C | H | N | Ca |
|---|---|---|---|---|
| Theoretical value_____percent__ | 45.35 | 8.20 | 8.82 | 6.30 |
| Experimental value_____do____ | 45.33 | 8.31 | 8.97 | 6.40 |

A similar result was shown by the analysis of ε-amino-η-caproic acid by formol titration, and of chlorine by silver nitrate titration, contained in the above molecular compound. Further, the diffraction of X-rays confirmed that the above crystal was a molecular compound, and the measurement of electric conductivity proved that the above molecular compound was of double salt. The molecular compound of ε-amino-η-caproic acid with calcium bromide is of colorless tabular- or rod-shaped crystal, with the melting point of 189–191° C. The result of elementary analysis is shown in the following table, according to which the mol ratio of ε-amino-η-caproic acid to calcium bromide in the said molecular compound is 4:1:

| $4NH_2(CH_2)_5COOH \cdot CaBr_2$ | C | H | N | Ca |
|---|---|---|---|---|
| Theoretical value_____percent__ | 39.8 | 7.18 | 7.73 | 5.52 |
| Experimental value_____do____ | 39.77 | 6.98 | 7.58 | 5.34 |

The active ingredients, $\epsilon_1$ and $\epsilon_2$, have the power of inhibiting completely the activity of plasmin at a very low concentration of $2 \times 10^{-6}$ mol, namely, 1/500,000 mol concentration. The measurement of anti-plasmin power can be made by admixing plasmin isolated from the blood of horse or man with fibrinogen separated from rabbit plasma as substrate, adding to the mixture a certain quantity of substance to be measured which had been diluted, forming fibrin clot by adding thrombin to the above mixture, and then by measuring the time required for the complete dissolution of fibrin clot incubated at 38° C., and comparing the said time with that of dissolution of control fibrin clot to which the substance to be measured had not been added. The anti-plasmin power of the substance to be measured is shown by the effective final concentration measured as above. (Loomis, E. C. George, C. and Ryder, A. Arch Biochem. 12 1. 1947; Christensen, L. R., J. Clin. invert. 28 163, 1949; Ratnoff, O.D., J. Exp. Med. 38, 401, 1948.)

As for the pharmacological effect of such active ingredients to the living organism, the following table clearly shows the anti-anaphylaxis effect thereof in the case of the experimental anaphylaxis of mice which occurs in protracted course:

| | Cases examined | Death | Living | Death rate by anaphylaxis, percent |
|---|---|---|---|---|
| ε-amino-η-caproic acid_____ | 37 | 10 | 27 | 27 |
| Control_____ | 36 | 23 | 13 | 64 |

On the other hand, a remarkable inhibiting effect to the Manteux Reaction was shown, as in the table hereunder, when local application of such active ingredients was made at the same time. Such substance having an inhibiting effect to the Manteux Reaction was scarcely known, and the active ingredients of the present invention are the most powerful ones which have been discovered. In group I of the following table, 0.1 cc. of tuberculin solution diluted to 2,000 times with physiological saline was respectively injected intracutaneously at the right arm of a child. At the same time, 0.1 cc. of 2,000 times tuberculin solution containing 2.5% by weight of the above active ingredient was respectively injected intracutaneously at the left arm. The size of redness and induration at the applied region was measured 24 hours and 48 hours after the injection. In group II of the following table, the above tuberculin solution and the above tuberculin solution containing active ingredient were respectively injected at the right and left arms as in group I, and after making additional injection of 2.5% active ingredient solution at the same region at every 12 hours, the measurement was made as in group I. The diameter of induration is shown in mm. by numerator, and the diameter of redness is shown in mm. by denominator in the following table:

| | Age | Sex | After 24 hours | | After 48 hours | | Inhibitory effect |
|---|---|---|---|---|---|---|---|
| | | | Left | Right (control) | Left | Right (control) | |
| Group I | 4 | ♂ | 3 x 3/10 x 14 | 5 x 5/20 x 25 | 3 x 3/0 | 5 x 5/25 x 25 | + |
| | 10 | ♂ | 0/0 | 3 x 3/10 x 9 | 0/4 x 4 | 3 x 3/10 x 5 | + |
| | 10 | ♂ | 0/4 x 4 | 4 x 4/25 x 27 | 0/0 | 4 x 4/20 x 18 | + |
| | 9 | ♀ | 0/4 x 4 | 10 x 8/13 x 15 | 0/5 x 5 | 10 x 5/13 x 10 | + |
| | 14 | ♀ | 0/6 x 5 | 0/10 x 8 | 0/5 x 5 | 2 x 3/7 x 8 | − |

|  | Age | Sex | After 24 hours | | After 48 hours | | Inhibitory effect |
| --- | --- | --- | --- | --- | --- | --- | --- |
|  |  |  | Left | Right (control) | Left | Right (control) |  |
| Group II | 7 | ♂ | 0/3 x 2.5 | 0/13 x 12 | 0/0 | 0/10 x 11 | + |
|  | 8 | ♂ | 0/6 x 4 | 0/14 x 14 | 0/2 x 2 | 0/5 x 5 | ± |
|  | 12 | ♂ | 2 x 3/4 x 4 | 2 x 3/4 x 4 | 0/0 | 0/11 x 9 | ± |
|  | 13 | ♂ | 0/8 x 6 | 0/8 x 8 | 0/0 | 0/8 x 9 | + |

Another experiment was made by giving per os the active ingredient to rabbits. The active ingredient was already recognised in blood after 30 minutes, which showed its maximum value in blood after five hours and disappeared after 24 hours. The excretion of such ingredient in urine was perceived in its original form at the rate of more than 30%, and therefore, it is shown that the excretion was fairly rapid and the substance did not accumulate in the organism. Still another experiment was made by adding such ingredient to the homogenate of liver and by making it stand. The result of the measurement revealed that such active ingredient was decomposed in vivo, especially in liver.

The toxicity examination of the active ingredient was made also, and it was made clear that the said active ingredient was not toxic. Namely, in the case of giving intravenously 1 gm. of such ingredient per 1 kg. of the weight of a mouse, no toxicity was noticed. And in the case of injecting intravenously 1 gm. per 1 kg. of the weight of a rabbit continuously for ten days at the rate of once per day, the rabbits were sacrificed after the lapse of one week, and the abnormality of organs was examined histologically. The result indicates that little or no trouble was seen.

Clinical results show the indisputable value of the compositions of the present invention, which are synthetic anti-plasmin substances, as an example of pathological application of enzyme inhibiting substances.

Among the active ingredients of the above compositions, the application methods of $\epsilon_1$ differ depending upon the kind of disease and clinical symptoms thereof. The following method, however, is generally used: In case $\epsilon_1$ is used as injection, a sterile parenteral solution, containing 0.5–35%, more preferably 2–25%, concentration of $\epsilon_1$ is suitable for subcutaneous, intramuscular and intravenous injection. For the subcutaneous injection, 2–5 cc. of the 5% solution is used each time. For the intramuscular injection, 2–5 cc. of the 1–10% solution, preferably 5% solution, is used. And, for the intravenous injection, the 2–25% solution, preferably 20 cc. of the 5% solution, or 5 cc. of the 25% solution is used. The solution of any intermediate concentration is also good. The use of 1–5 gm. per day of $\epsilon_1$ will be effective against many kinds of diseases. The use of more per day, or the use of every day consecutively will give no toxicity.

In case $\epsilon_2$ is used as injection, $\epsilon_2$ may be dissolved in the sterile parenteral solution, as in the case of $\epsilon_1$. The anti-plasmin effect of $\epsilon$-amino-n-caproic acid, combined with other therapeutic effects of calcium halide, particularly those of calcium bromide, are remarkable. And, in this case, the intravenous injection is especially to be recommended, and 20 cc. of the 7% $\epsilon_2$ solution will be used at one time. For example, the 7% injection may be prepared by dissolving a compound represented by $4NH_2(CH_2)_5COOH \cdot CaBr_2$ in sterile parenteral solution, such as sterile distilled water. The solution will contain 5% of $\epsilon_1$, namely $\epsilon$-amino-$\eta$-caproic acid and 2% of calcium bromide. Although the quantity of $\epsilon_2$ used will be controlled by calcium halide contained therein, a satisfactory therapeutic effect can be obtained by the use, once or twice per day, of 20 cc. of the above 7% solution each time.

In case $\epsilon_1$ is orally administered, 0.1–20 gm., preferably 0.5–10 gm. will be given at one time. When the form of tablets, powders, capsules or other dosage forms are taken, a significant amount of a solid material which is pharmaceutically used as carrier will be admixed with $\epsilon_1$, so that $\epsilon_1$ will be substantially more than 0.5% by weight. As $\epsilon_1$ is hygroscopic, its use as composition with or without carrier in the form of capsule is indicated. It is practical to prepare drugs in the capsule form, a single capsule containing 0.1–1 gm., preferably 0.5 gm. of $\epsilon_1$ in a resorbable substance generally used for capsule. Compared with the case of injection, twice as much of effective active ingredients will be given. By this way, a satisfactory result can be obtained, and even when more than 10 gm. are given per day, there is no fear of toxicity. Also, $\epsilon_1$ may be used as above by applying a moisture-proof coating after it is taken in a suitable form, with or without the above solid carrier.

In case $\epsilon_2$ is orally administered, 0.1–10 gm., preferably 0.5–5 gm., of the molecular compound of $\epsilon$-amino-$\eta$-caproic acid with calcium chloride or, 0.1–5 gm., preferably 0.5–2 gm., of the molecular compound of $\epsilon$-amino-$\eta$-caproic acid with calcium bromide will be given. Either one of such compounds will be used without carrier, or will be admixed with a significant amount of a carrier so that it will be substantially more than 0.5% by weight of the mixture. One of $\epsilon_2$, which is the molecular compound with calcium chloride, has little or no deliquescence, and therefore, it is to be recommended to prepare the compound, with or without carrier, in the form of powders and tablets.

It must be added that $\epsilon_1$ can be applied topically as ointment against skin diseases, and a satisfactory result will be obtained. In this case, 0.1–10%, preferably 2–5%, of the active ingredient to the ointment is used. As ointment base, emulsions-ointment generally used pharmaceutically, more especially, oil-in-water type and water-in-oil type emulsions ointment can be used. A better result can be obtained by the concurrent use, as topical application and intravenous injection, of $\epsilon_1$, than by the sole use as topical application. As eye lotion, a sterile parenteral solution with 0.1–10%, preferably 2–5%, concentration of $\epsilon_1$ will be prepared.

Among many examples which show the anti-plasmin effect of the above active ingredients to the living organism and the utility thereof, certain number of them are described hereunder, together with processes for making the above compositions. It must be noted, however, that the effect of the compositions of the present invention is not to be limited to the above description and to the following examples.

*Example 1*

2 cc. of the 5% $\epsilon_1$ solution, prepared by dissolving 25 grams of the $\epsilon$-amino-$\eta$-caproic acid containing no inorganic ions or other impurity, in distilled water to form 500 cc. of sterile injection containing 5% of $\epsilon_1$, were subcutaneously injected, once every day, to a female baby of 6 months old, who was suffering from infant eczema, and who, after having been treated repeatedly by the generally practised methods which, however, proved to be ineffective, had eczema all over the body, was complaining of itch and was having salient redness. The result was that although the redness and the exudation became worse two or three days after the injection, and the temporary aggravation was noticed, the affected parts began to dry up rapidly from the fourth day, the redness alleviated noticeably, and she was completely recovered at the seventh day.

Example 2

The 5% $\epsilon_1$ solution, prepared as in Example 1, was subcutaneously injected, once every day, to a male baby of 6 months old, who was having eczematous dermatitis, exudative and conspicuously red on the face, neck and body skin. He was completely recovered after ten days.

Example 3

The 5% $\epsilon_1$ solution, prepared as in Example 1, was subcutaneously injected, once every day, to a male baby of 6 months old, who was having eczema, exudative and conspicuously red on the face, the chest, the neck and the back. He was completely recovered in six days.

Fourteen days after he left the hospital, however, redness was noticed on the face and the neck, and eczema began to develop again. On the eighteenth day, the eruption broke out as at the time of the first examination, but by giving subcutaneously the 5% solution, he was completely recovered in seven days.

Example 4

2 cc. of the 5% $\epsilon_1$ solution, prepared as in Example 1, were subcutaneously injected, once every day, to a male boy of 7 months old, who was having eczema, conspicuously red and exudative, on the face, neck and chest. At the same time, 5% emulsions-ointment (its composition is shown hereunder) was applied. Although no change was seen on the first day and redness and exudation slightly increased on the second day, redness conspicuously decreased and exudation also decreased on the third day, eczema region almost dried up and redness disappeared on the fourth day, and he was almost recovered on the fifth day.

| | Percent |
|---|---|
| White Vaseline | 2.25 |
| Stearic acid | 15.75 |
| Cetyl alcohol | 42.00 |
| Oleyl poly ethylene glycol ether | 5.00 |
| Water | 35.00 |

We claim:

1. A method of treating diseases selected from the group consisting of those accompanied by high plasmin activity and those caused by activation of plasmin which comprises introducing into the body an inhibiting substance specific to the proteolytic action of human plasmin, said substance being taken from the class consisting of $\epsilon$-amino-$\eta$-caproic acid and its molecular compound with calcium halide, and a carrier for said substance.

2. A method according to claim 1 in which said substance constitutes about 0.5% to 90% of the composition.

3. A method according to claim 1 in which said substance constitutes about 2% to 25% of the composition.

4. A method according to claim 1 in which said carrier is a sterile parenteral liquid.

5. A method according to claim 1 in which said carrier is a solid pharmaceutical material.

6. A method according to claim 1 in which said carrier is a sterile parenteral aqueous liquid.

7. A method according to claim 1 in which the amount of said substance introduced into said body is 0.1 to 20 grams per dose.

8. A method according to claim 1 in which the amount of said substance introduced into said body is 0.1 to 10 grams per dose and said molecular compound with calcium halide is present.

9. A method according to claim 4 in which said mixture contains 0.5 to 7.0% of said molecular compound with calcium halide.

10. A method according to claim 1 in which the amount of said substance introduced into said body is 0.1 to 20 grams per dose of said free amino acid.

11. A method according to claim 1 in which the amount of said substance introduced into said body is 0.1 to 5.0 grams per dose of said molecular compound with calcium halide taken from the class consisting of calcium chloride and bromide.

12. A method according to claim 4 in which said mixture contains 0.5 to 35% of said free amino acid.

References Cited in the file of this patent

UNITED STATES PATENTS 2,666,012     Ferguson     Jan. 12, 1954

OTHER REFERENCES

Bacq et al.: Schwerzerische Medizinische Wochenschrift, vol. 82, 40, 1018–1020 (1952).

Hill et al.: Medicine, vol. 1 (1932), pp. 141–142.

Watanahi: Chem. Abst., vol. 46 (1952), pp. 9716–9717.

Shirasaki: Chem. Abst., vol. 46 (1952), p. 1042.

MacIntire: J. Am. Chem. Soc., vol. 66 (1944), pp. 1317–1318.

Ludwig: Repertorium pharmazeutischer Spezialpraparate sera und Impfstoffe, 1948, Beobachter, Basel, p. 645.

Minerva Medica, vol. 37 (1946), p. 273.

Nicholas: Bull. soc. franc. de dermato, et syph., February 1, 1936, pp. 830–834.